2,346,495

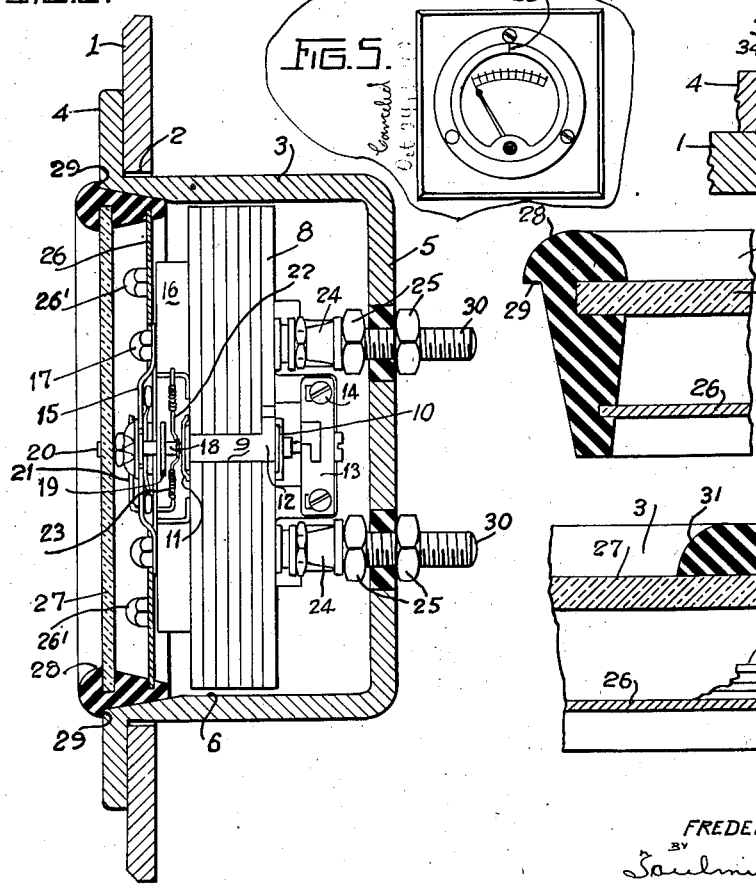
April 11, 1944. F. J. LINGEL 2,346,495
ELECTRICAL MEASURING INSTRUMENT
Filed Sept. 12, 1941 2 Sheets-Sheet 1
Inventor
FREDERICK J. LINGEL,
BY
Attorney April 11, 1944.   F. J. LINGEL   2,346,495
ELECTRICAL MEASURING INSTRUMENT
Filed Sept. 12, 1941    2 Sheets-Sheet 2
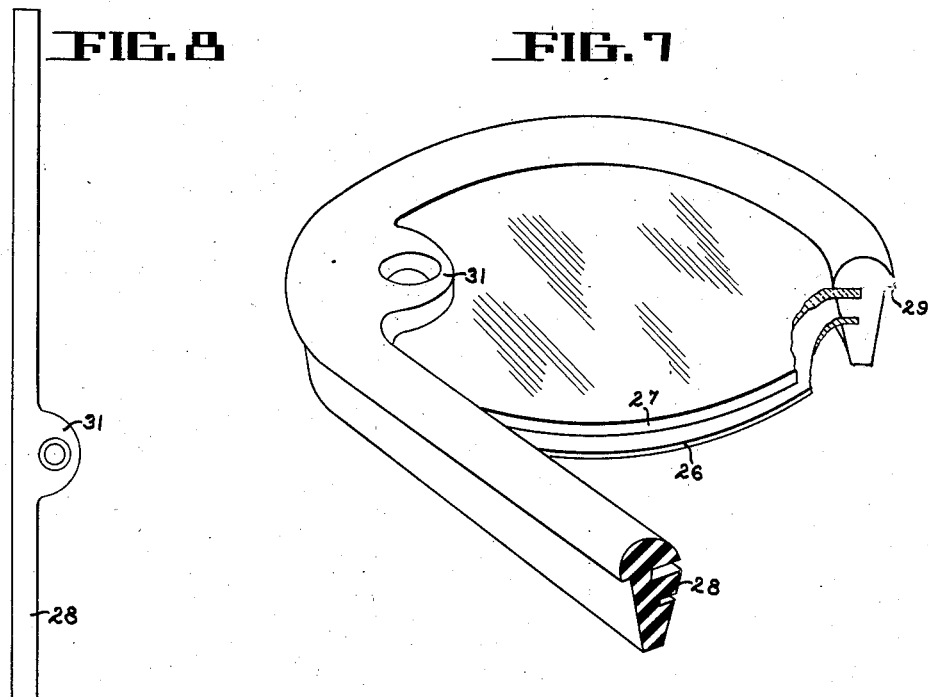
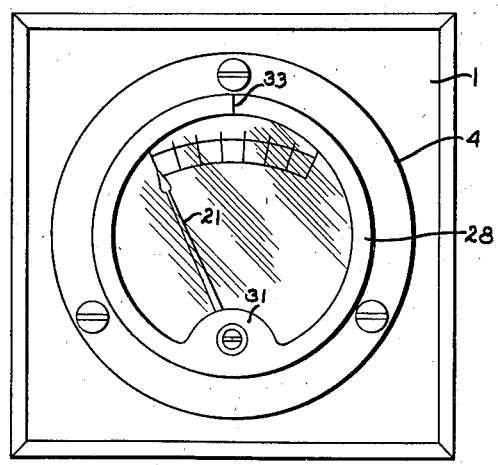
INVENTOR
FREDERICK J. LINGEL
BY
Toulmin & Toulmin
ATTORNEY Patented Apr. 11, 1944

UNITED STATES PATENT OFFICE 2,346,495

ELECTRICAL MEASURING INSTRUMENT

Frederick J. Lingel, Bluffton, Ohio, assignor to Ray L. Triplett, Bluffton, Ohio Application September 12, 1941, Serial No. 410,569

17 Claims. (Cl. 171—34)

The present invention relates to electrical instruments, and more particularly to improved methods and apparatus for mounting an instrument movement within its casing.

In the manufacture of small ammeters and voltmeters it is customary to mount the unit with the dial plate in position on a base which forms the back cover plate of the instrument casing. The latter is usually molded as an open-ended cylinder of hard rubber, or phenolic condensation product such as Bakelite, and one of the ends is closed by said closure plate and the other end is closed by a window which extends over the dial of the contained movement. For purposes of assembly the window is carried by a metal ring which fits snugly within the cylindrical casing and bears against a beaded flange member, the structure being rendered dust-proof and moisture-proof by calking small crevices existing between the window and the ring or between the ring and the casing. The window is usually permanently fixed in position, but the cover plate is detachably secured to the casing by means of peripherally disposed screws which permit the removal of the interior movement for inspection, replacement, adjustment, etc.

While this general construction is satisfactory, it has been found that notwithstanding the care and skill exercised in calking the glass window to the casing, and notwithstanding the closeness of fit between the cover plate and the casing, appreciable amounts of dust and moisture will inevitably find their way to the interior of the casing. This dust and moisture may in time affect the sensitiveness of the moving parts of the instrument, causing wear, friction, etc. Moreover, the necessity for providing a snug fit between the various parts in order to reduce the tendency for leakage, calls for highly skilled labor, machining of parts and other expensive operations which add to the cost of manufacture.

The primary object of the present invention is to provide an electrical instrument, more particularly an ammeter or voltmeter, which may be inexpensively made and readily assembled, and also one in which the casing is substantially completely proof against moisture and dust so as to insure a long operating life to the instrument. This object is carried out, in brief, by providing a casing which is of an integral construction on all sides except one side through which the movement as a whole, and also the window, are inserted. The window is applied as a rubber shielded sheet of glass having a dimension such as completely to fill and effectively to seal the open end of the casing after the movement has been mounted in position.

Another object is to have the case and base integral with but one opening through which the movement is fitted to the base and which opening is then closed with the window, thus forming a stronger casing compared with the usual practice of a casing with an opening for both the window and base.

Other objects and features will be observed upon perusal of the following specification together with the accompanying drawings.

In the drawings:

Figure 1 is a plan view of the improved instrument.

Figure 2 is a transverse sectional view taken along the line 2—2 in Figure 1, and looking in the direction of the arrows.

Figures 3 and 4 are fragmentary sectional views taken on the lines 3—3 and 4—4, respectively, of Figure 1.

Figure 5 is a diminutive plan view of the entire improved instrument, but modified as to the character of the bezel element.

Figure 6 is an enlarged fragmentary view of the modified form of bezel.

Figure 7 is a diagrammatic view showing the bezel element partly wound around the window and dial while Figure 8 illustrates the bezel element of Figure 7 in a flat developed form.

Referring to the drawings, reference numeral 1 designates a panel which has been shown in Figure 1 as of rectangular shape, but which may comprise part of a large switchboard on which the instrument is mounted. The panel is provided with an opening 2, preferably of round configuration, which loosely receives the cylindrical casing 3 of the improved instrument. This casing may be formed of any suitable insulating material, for example hard rubber, or a plastic such as a phenolic condensation product Bakelite and, as illustrated, metal may also be employed for this purpose. The casing is provided at one end with an outwardly extending lip or flange 4 and at the other end is closed by an integral portion 5, so that the entire casing is made of one piece, substantially closed except for a large opening 6 through which the movement is inserted. The part of the opening nearer the flange 4 is tapered outwardly, for reasons which will appear presently. The flange 4 may be secured to the panel in any suitable manner, for example, by three or more equidistantly spaced screws 7.

The movement of the instrument is shown more particularly in Figure 2, but only a general description will be given because the invention does not reside in the movement per se. The magnet assembly, indicated at 8, is shown as being formed of seven relatively thin magnetic plates which take the general form of a horseshoe, having an air gap indicated at 9. This air gap is provided with curvilinear opposed surfaces, in which the rotative element 10 of the instrument is mounted and adapted to rotate. This element may comprise a coil 11, wound on a hollow rectangular frame and surrounding a stationary core 12. The coil is mounted at each end on jewel bearings, one of the bearings being illustrated as a bridge support 13, the parts of which may be removed by loosening the screws 14. The jewel bearing for the other end of the coil is carried on a transversely extending truss 15 which is seated on a plate 16 of insulation material, and bolted to the magnetic assembly as indicated at 17. A shaft 18 extends between the jewel bearing and the front end of the coil 11.

As shown in Figure 2, the shaft 18 is provided with a hair spring 19 or spiral filament which gives the shaft and its coil a biased position of rotation, and also serves to conduct current from the source of supply to the rotating coil. One end of the spring, usually the inner end, is secured to the shaft 18, thus rotating therewith, and the other end of the spring is secured through a connecting pivoted element to a stationary part of the casing. This connecting element (not shown) is usually carried through the casing at any suitable point, and terminates in a so-called "zero adjustment," indicated in Figure 1 by a screw 20. Thus by turning the screw the tension on the hair spring or filament may be controlled to increase or decrease the force which tends to restore the pointer of the instrument to zero, and against which the pointer operates as it moves over the dial. The pointer of the instrument is shown at 21, and forms part of a cross-shaped member 22 which is mounted on the shaft 18. Three legs of this member are provided with small counterweights 23 to assist in balancing the weight of the pointer, as is well known in the art. Connections for the two ends of the coil 11 are taken through a pair of insulatingly mounted binding posts 24 which pass through the back plate 5 of the casing, and are held in position by the nuts 25. The dial over which the pointer 21 sweeps is shown at 26, this dial being secured to the plate 16 by screws 26', or in any other suitable manner. There is a glass protecting plate indicated at 27, through which the position of the pointer on the dial may be observed.

Whereas in the prior art it is customary to form the back plate 5 as a separate element from the casing 3 and to mount the entire movement on the removable back plate, which is thereafter secured by screws to the casing, in accordance with the present invention, the movement is introduced from the front end of the instrument so that the back plate can be formed integral with the casing. There is therefore no joint between the back plate and the casing, and little or no possibility of moisture or dust being introduced through the rear side of the casing, into the movement.

As shown in Figures 2, 3 and 4, the glass plate 27 and the dial plate 26 are of somewhat smaller diameter than the internal diameter of the casing 3, and the peripheral edges of these two circular elements are introduced into rectangular grooves which extend around the interior surface of a bezel 28, which is effectively interposed between the edges of these two elements and the tapered portion of the opening 6. The bezel is preferably made of relatively soft rubber in order to exert a wedging effect when in position, and to facilitate the introduction of the glass member 27 and the dial 26 into the internal peripheral grooves. For convenience as well as for esthetic effect, the outer surface of the bezel is provided with a semicircular shape and a shoulder, indicated at 29, where the bezel rests on the flange 4. The outside diameter of the bezel is given a straight taper in order to conform with the taper of the opening 6. The internal surface of the bezel is also preferably tapered so as to introduce sufficient pliability at the inner portion of the bezel in order to permit a strong wedging effect against the casing when the plate elements 27, 26 are mounted in position.

When the movement is to be introduced into the casing 3, and assuming that all of the elements of the movement have been assembled and that the outer nuts 25 have been removed to permit the threaded studs 30 to be passed through suitable openings in the casing, the next step is to apply the bezel to the peripheral edges of the elements 26, 27. It will be understood that when the casing is made of metal it is necessary to interpose an insulating material between each stud 30 and the casing. The bezel may be applied by merely stretching the element outwardly and inserting the glass plate and dial into their respective grooves. The whole assembly is then introduced into the casing, and when the outer nuts 25 have been tightened it will be found that the rubber bezel will have been drawn inwardly of the casing and will make a positive moisture and dust-tight joint between the rubber and the casing. It will be noted that after the bezel has been applied to the glass plate and dial, only one operation, i. e. tightening of the nuts 25 is necessary to mount the entire movement, including the dial plate and glass observation plate in position. The outer tapered surface of the bezel causes a strong wedging action to take place between the rigid edges of the glass and dial plates, on the one hand, and the casing on the other hand, and this wedging action can be increased if desired by simply tightening the outer nuts 25. When the latter are loosened the joint between the bezel and the casing 3 is readily broken so that the entire assembly, including the instrument movement, may be readily removed for inspection, adjustment, etc.

While I have described the bezel as being formed of rubber, it is apparent that other materials may be used for this purpose which have a high degree of flexibility and elasticity, such as some of the plastics. Instead of using a continuous ring, it may be feasible to employ a bezel in strip form, wound around the glass and dial plates. Such a modification has been illustrated in Figures 5, 6, 7 and 8 in which the bezel 32 is made of flexible material in strip form, such as rubber or plastics, but is preferably of metal in bendable form, the two ends of the strip being brought into abutting relation as indicated at 33 (Figure 5). The metal strip may be formed with the necessary number of grooves to receive the dial plate 26 and the glass plate 27. A gasket 34 formed of a rubber continuous ring member may be inserted between the overhanging ledge 35 of the bezel 32 and the flange 4 of the casing.

Inasmuch as this modified construction would involve a joint between the abutting ends of the strip, with the attendant possibility of permitting moisture or dust to creep therethrough, the continuous-ring form of bezel shown in Figures 2 to 4 is considered more desirable. As shown in Figures 1, 4 and 5, the bezel, regardless of whether being made of a continuous ring or in strip form, may have the inwardly projecting circular extension 31 at the position of the zero-set screw, this extension being provided with an opening in line with a similar opening in the glass plate 27 to receive the screw.

It will be understood that I desire to comprehend within my invention such modifications as come within the scope of the claims and the invention.

Having thus fully described my invention, what I claim as new and desire to secure by Letters Patent, is:

1. An electrical measuring instrument comprising a movement formed of a stationary magnet assembly and a coil rotatably associated therewith, said coil carrying a pointer which is adapted to swing over a dial when the coil is energized, a casing for said movement, said casing being formed of one piece with an opening through which the movement is introduced, a window for the dial extending within and at least partly over the opening, and a self-sealing insert positioned between the window and the interior surface of the casing so as to space the periphery of the window from the casing and to constitute the sole support between these elements.

2. An electrical measuring instrument comprising a movement formed of a stationary magnet assembly and a coil rotatably associated therewith, said coil carrying a pointer which is adapted to swing over a dial when the coil is energized, a casing for said movement formed of one piece with an opening through which the movement is introduced, and a self-sealing insert carried by the dial and positioned between the dial and the casing.

3. An electrical measuring instrument comprising a movement formed of a stationary magnet assembly and a coil rotatably associated therewith, said coil carrying a pointer which is adapted to swing over a dial when the coil is energized, said dial being secured to said magnet assembly, a casing for said movement, said casing being formed of one piece with an opening through which the movement is introduced, a self-sealing insert carried by the dial and positioned between the dial and the casing, and a common means for securing the dial, insert and movement to the casing.

4. An electrical measuring instrument comprising a movement formed of a stationary magnet assembly and a coil rotatably associated therewith, said coil carrying a pointer which is adapted to swing over a dial when the coil is energized, a casing having an opening through which the movement is introduced into the casing, and means for closing said opening, said means comprising a window and a rubber self-sealing insert positioned between the peripheral edge of the window and the interior surface of the casing, said insert being the sole supporting means between the window and the casing.

5. An electrical measuring instrument comprising a movement formed of a stationary magnet assembly and a coil rotatably associated therewith, said coil carrying a pointer which is adapted to swing over a dial when the coil is energized, a casing for said movement having an opening through which the movement is introduced, a glass window in spaced relation with the dial, said window and dial being of smaller diameter than the interior diameter of the casing, and a single flexible spacing element between the window, dial and the casing, said element serving to support the window and dial in the casing.

6. An electrical measuring instrument comprising a movement formed of a stationary magnet assembly and a coil rotatably associated therewith, said coil carrying a pointer which is adapted to swing over a dial when the coil is energized, said dial being secured to said magnet assembly, a casing for said movement, said casing being formed of one piece with an opening through which the movement is introduced, a glass window in spaced relation with the dial, a rubber self-sealing insert securing the window in spaced relationship with the dial, said self-sealing insert being positioned between the window and the interior surface of the casing, and a common means for securing the dial, insert window and movement to the casing, said window and insert serving completely to close the opening in the casing.

7. An electrical measuring instrument comprising a movement formed of a stationary magnet assembly and a coil rotatably associated therewith, said coil carrying a pointer which is adapted to swing over a dial when the coil is energized, said dial being secured to said magnet assembly, a casing for said movement, said casing being formed of one piece with an opening through which the movement is introduced, a glass window in spaced relation with the dial, and an insert positioned between the window, the dial and the interior surface of the casing, said insert comprising a ring of flexible material having a pair of internal grooves which receive the peripheral edges of the dial and the glass window.

8. An electrical measuring instrument comprising a movement formed of a stationary magnet assembly and a coil rotatably associated therewith, said coil carrying a pointer which is adapted to swing over a dial when the coil is energized, said dial being secured to said magnet assembly, a casing for said movement, said casing being formed of one piece with an opening through which the movement is introduced, a glass window in spaced relation with the dial, and an insert positioned between each, of the window, the dial and the interior surface of the casing, said insert having a tapered configuration which causes the insert to wedge itself between the edges of the dial and glass window on the one hand and the casing on the other hand upon insertion of said movement into the casing.

9. An electrical measuring instrument comprising a movement formed of a stationary magnet assembly and a coil rotatably associated therewith, said coil carrying a pointer which is adapted to swing over a dial when the coil is energized, a glass window in spaced relation with said dial, said casing having an opening to receive the movement, dial and glass window, said opening being of tapered configuration opposite the peripheral edges of the window and dial, a rubber bezel of tapered configuration adapted to receive along its inner surface the peripheral edges of the window and dial, and means for clamping the movement, dial and window within the casing whereby to cause the outside surface of the bezel to contact the tapered surface of the casing and completely to conceal the opening in the casing.

10. An electrical measuring instrument comprising a movement formed of a stationary magnet assembly and a coil rotatably associated therewith, said coil carrying a pointer which is adapted to swing over a dial when the coil is energized, a casing for said movement, said casing being formed of one piece with an opening through which the movement is introduced, a window for the dial extending within and at least partly over the opening, and a substantially self-sealing insert positioned between the window and the interior surface of the casing whereby the interior of the casing is rendered substantially free of moisture and dust, said self-sealing insert being constituted of a strip which is wound around the peripheral edges of the dial and window.

11. An electrical measuring instrument comprising a movement formed of a stationary magnet assembly and a coil rotatably associated therewith, said coil carrying a pointer which is adapted to swing over a dial when the coil is energized, a casing for said movement, said casing being formed of one piece with an opening through which the movement is introduced, a window for the dial extending within and at least partly over the opening, and a substantially self-sealing insert positioned between the window and the interior surface of the casing whereby the interior of the casing is rendered substantially free of moisture and dust, said self-sealing insert being constituted of a metal strip which is wound around the peripheral edges of the dial and window.

12. An electrical measuring instrument comprising a movement formed of a stationary magnet assembly and a coil rotatably associated therewith, said coil carrying a pointer which is adapted to swing over a dial when the coil is energized, a casing for said movement, said casing being formed of one piece with an opening through which the movement is introduced, a window for the dial extending within and at least partly over the opening, and a self-sealing insert positioned between the periphery of said window and the interior surface of the casing whereby the interior of the casing is rendered substantially free of moisture and dust, said insert comprising a continuous ring of flexible material.

13. An electrical measuring instrument comprising a movement formed of a stationary magnet assembly and a coil rotatably associated therewith, said coil carrying a pointer which is adapted to swing over a dial when the coil is energized, a casing for said movement, said casing being formed of one piece with an opening through which the movement is introduced, a window for the dial extending within and at least partly over the opening, and a substantially self-sealing insert positioned between the periphery of said window and the interior surface of the casing whereby the interior of the casing is rendered substantially free of moisture and dust, said insert comprising a single discontinuous ring of a flexible material applied about the edges of the dial and window.

14. An electrical measuring instrument comprising a casing with an opening at one end, an instrument movement contained in the casing including a movable pointer, a stationary dial over which the pointer is adapted to move and a window extending over said dial, said window and dial being of smaller diameter than the opening in said casing, and a self-sealing insert positioned between each, of the window and dial and the interior surface of said casing.

15. An electrical measuring instrument comprising a casing having an opening at one end, an instrument movement mounted within said casing, said movement including a pointer and a dial over which the pointer is adapted to move, a window having an opening and parallelly mounted with respect to said dial and extending within said casing opening, and a self-sealing insert positioned between said window and the interior surface of the casing, said insert being provided with an inward radially extending projection, and an opening in said projection coinciding with the opening in said window for receiving a zero set screw by which the instrument is adjusted.

16. An electrical measuring instrument comprising a casing having an opening at one end, an instrument movement mounted within said casing, said movement including a pointer and a dial over which the pointer is adapted to move, a window having an opening and parallelly mounted with respect to said dial and extending within said casing opening, and a self-sealing insert positioned between said window and the interior surface of the casing, said insert being provided with an inward radially extending projection, and an opening in said projection coinciding with the opening in said window for receiving a zero set screw by which the instrument is adjusted, said inward radially extending projection of the insert being adapted to be drawn tightly against the exterior surface of the window in order to prevent the admission of moisture and dust to the interior of the casing.

17. An electrical measuring instrument comprising a movement formed of a stationary magnet assembly and a coil rotatably associated therewith, said movement also including a dial, said coil carrying a pointer which is adapted to swing over said dial when the coil is energized, a casing for said movement formed of one piece with an opening through which the movement is introduced and a self-sealing insert carried by said movement and positioned between the movement and the casing.

FREDERICK J. LINGEL.